US009511653B2

(12) United States Patent
Ide

(10) Patent No.: US 9,511,653 B2
(45) Date of Patent: Dec. 6, 2016

(54) VEHICLE SUNROOF DEVICE

(71) Applicant: AISIN SEIKI KABUSHIKI KAISHA, Kariya-shi, Aichi-ken (JP)

(72) Inventor: Yoshitaka Ide, Anjo (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/765,106

(22) PCT Filed: Jan. 29, 2014

(86) PCT No.: PCT/JP2014/051952
§ 371 (c)(1),
(2) Date: Jul. 31, 2015

(87) PCT Pub. No.: WO2014/123047
PCT Pub. Date: Aug. 14, 2014

(65) Prior Publication Data
US 2015/0375606 A1    Dec. 31, 2015

(30) Foreign Application Priority Data

Feb. 8, 2013   (JP) ................................ 2013-023397

(51) Int. Cl.
| B60J 7/047 | (2006.01) |
| B60J 7/043 | (2006.01) |
| B60J 7/02 | (2006.01) |
| B60J 7/057 | (2006.01) |

(52) U.S. Cl.
CPC ............... *B60J 7/0435* (2013.01); *B60J 7/024* (2013.01); *B60J 7/0573* (2013.01)

(58) Field of Classification Search
CPC ........................................................ B60J 7/19
USPC .................. 296/216.02–216.05, 224, 220.01
See application file for complete search history.

(56) References Cited

U.S. PATENT DOCUMENTS

| 4,688,848 A * | 8/1987 | Niwa ..................... B60J 7/0435 |
| | | 296/216.03 |
| 2005/0127719 A1 | 6/2005 | Sawada et al. |
| 2009/0072589 A1 | 3/2009 | Ito et al. |
| 2012/0001458 A1 | 1/2012 | Sawada |
| 2013/0234475 A1 | 9/2013 | Katsura |
| 2013/0264845 A1 | 10/2013 | Katsura et al. |

FOREIGN PATENT DOCUMENTS

| DE | 35 09 691 A1 | 4/1986 |
| DE | 10 2010 018 867 A1 | 11/2011 |
| JP | 2-117418 | 5/1990 |

(Continued)

*Primary Examiner* — Dennis H Pedder
(74) *Attorney, Agent, or Firm* — Finnegan, Henderson, Farabow, Garrett & Dunner, LLP

(57) ABSTRACT

A vehicle sunroof device includes a movable panel, a guide rail, a sliding member, a check mechanism, and a lock-unlock switching mechanism. The check mechanism locks the forward and backward movement of the movable panel and brings the movable panel into a tilt-up state. The check mechanism includes a rotation check member having either an engagement groove or an engagement projection. When the movable panel moves to the tilt up state, the rotation check member is in a rotation position at which the rotation check member locks movement of the movable panel. In the tilt up state, when the sliding member moves further forward and then moves backward, the rotation check member pivots to move to a pivoting position at which the rotation check member unlocks movement of the movable panel.

3 Claims, 5 Drawing Sheets

(56) References Cited

FOREIGN PATENT DOCUMENTS

| | | |
|---|---|---|
| JP | 2000-108676 | 4/2000 |
| JP | 4109583 | 7/2006 |
| JP | 2009-113680 | 5/2009 |
| JP | 2009-119996 | 6/2009 |
| JP | 2010-254180 | 11/2010 |
| JP | 2014-118107 | 6/2014 |

* cited by examiner

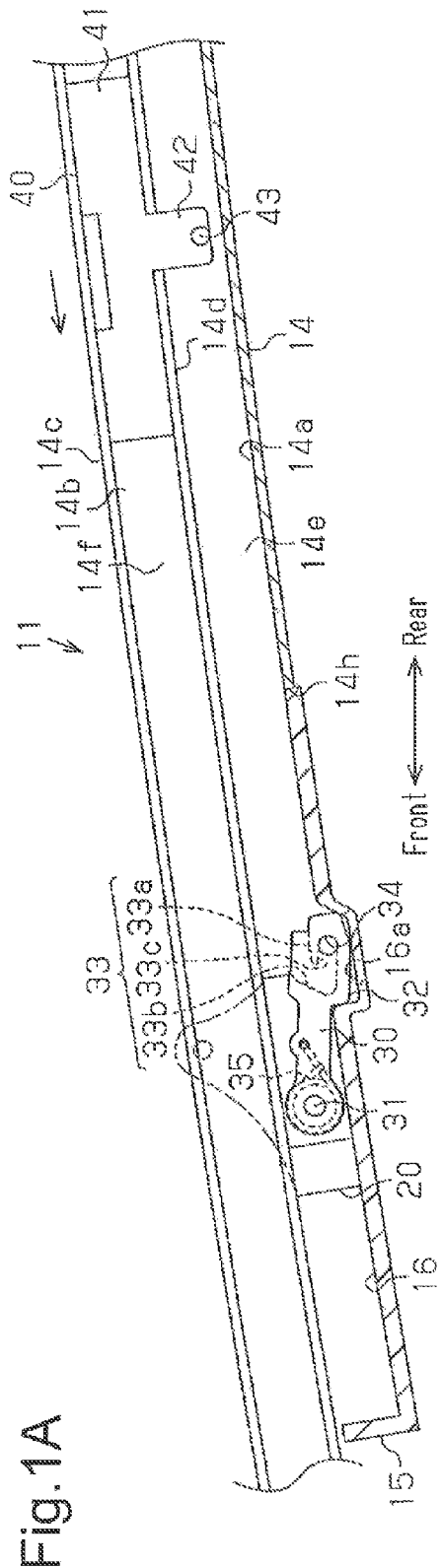
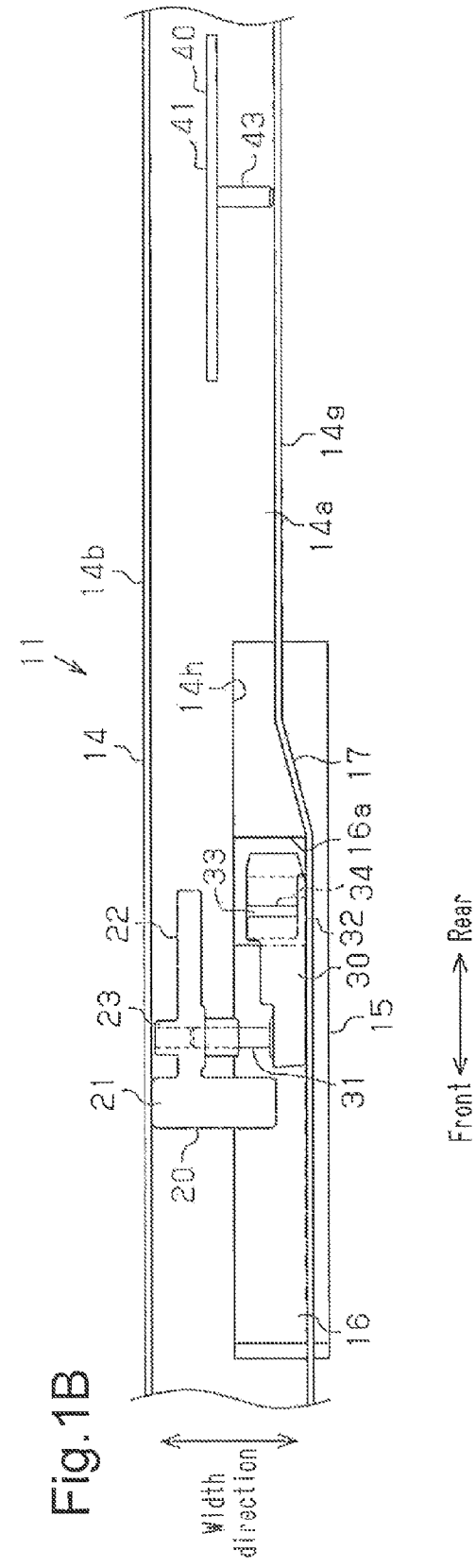

VEHICLE SUNROOF DEVICE

CROSS-REFERENCE TO RELATED APPLICATIONS

This application is a national phase application of International Application No. PCT/JP2014/051952, filed Jan. 29, 2014, and claims the priority of Japanese Application No. 2013-023397, filed Feb. 8, 2013, the content of both of which is incorporated herein by reference.

TECHNICAL FIELD

The present invention relates to a vehicle sunroof device.

BACKGROUND ART

Patent Document 1 describes a known outer sliding sunroof, which is an example of a vehicle sunroof device. This device includes a link mechanism, which supports a movable panel. The link mechanism includes a rear lift link, which pivots when a first shoe slides, a front lift link, which pivots when a second shoe slides, and a connecting rod, which couples the rear lift link to the second shoe and moves the second shoe to slide when the rear lift link pivots. The rear lift link pivots and lifts the rear edge of the movable panel when the first shoe slides. During this process, the connecting rod transmits the pivoting motion of the rear lift link, to the second shoe. This causes the second, shoe to slide, which pivots the front lift link and lifts the front edge of the movable panel. The movable panel thus tilts upward.

Then, the first and second shoes slide so that the movable panel slides above the roof while being tilted upward. This opens the opening formed in the roof panel. An engagement structure, which is provided between the rear lift link and the first shoe, functions to pivot the rear lift link. The engagement structure thus allows the movable panel to slowly tilt upward.

PRIOR ART DOCUMENTS

Patent Documents

Patent Document 1: Japanese Laid-Open Patent Publication No. 2000-108676
Patent Document 2: Japanese Patent No. 4109583

SUMMARY OF THE INVENTION

Problems that the Invention is to Solve

In the vehicle sunroof device of Patent Document 1, the movement amount (operation stroke) of the first shoe required to move from the fully closed state to the fully open state is the movement amount by which the sunroof device shifts from the fully closed state to the fully open state via the tilt up state. Thus, if the movement amount of the first shoe required to move from the fully closed state to the tilt up state (hereinafter also referred to as "tilt operation stroke") is increased, the movement amount, of the first shoe required to move to the fully open state may not be achieved, that is, the opening amount of the movable panel may be insufficient.

The tilt operation strobe corresponds to a high-load section where the movable panel is lifted and lowered and is thus desired to be longer. Decrease in the tilt operation stroke would increase the load per unit operation stroke, which would require the electric driving source (such as a motor) that drives the first shoe to be enlarged.

Patent Document 2 describes a vehicle sunroof device (outer sliding sunroof) that includes guide rails on which shoes slide. The guide rails extend through the front frame (housing) and project frontward. Patent Document 2 describes that such a structure increases the opening amount of the movable panel or increases the support span of the movable panel without decreasing the opening amount of the movable panel.

However, extending the guide rails through the front frame increases the opening amount of the movable panel only slightly. Thus, the opening amount is still difficult to increase.

It is an objective of the present invention to provide a vehicle sunroof device that increases the opening amount of a movable panel that opens in a tilt up state.

Means for Solving the Problems

To achieve the foregoing objective and in accordance with one aspect of the present invention, a vehicle sunroof device is provided that includes a movable panel configured to open and close an opening formed in a roof of a vehicle, a guide rail configured to be located at an edge in a vehicle width direction of the opening and extend in a vehicle front-rear direction, a sliding member, which is coupled to an edge in the vehicle width direction of the movable panel and moved in the vehicle front-rear direction along the guide rail by an electric driving source, a check mechanism, and a lock-unlock switching mechanism. The check mechanism is configured such that, when the sliding member moves toward the front of the vehicle while the movable panel, is in a fully closed state, the check mechanism locks movement of the movable panel in the vehicle front-rear direction and lifts a rear section of the movable panel with a front section of the movable panel functioning as a pivot so as to bring the movable panel into a tilt up state, and that, when the sliding member moves toward the rear of the vehicle after further moving toward the front of the vehicle while the movable panel is in the tilt up state, the check mechanism maintains the tilt up state and unlocks movement of the movable panel. The lock-unlock switching mechanism includes a first member, which is supported by one of the sliding member and the edge in the vehicle width direction of the movable panel, and a second member, which is supported Or the other one of the sliding member and the edge in the vehicle width direction of the movable panel. Further movement of the sliding member toward the front of the vehicle in the tilt up state causes one of the first member and the second member to press the other one of the first member and the second member so that the first member is engaged with the second member such that the sliding member and the movable panel move integrally when the sliding member later moves toward the rear of the vehicle. The check mechanism includes a rotation check member, which includes one of an engagement groove and an engagement projection and is pivotally coupled to the edge in the vehicle width direction of the movable panel. When the movable panel moves from the fully closed state to the tilt up state, the rotation check member is at a first pivoting position at which the rotation check member locks movement of the movable panel. When the sliding member further moves toward the front of the vehicle in the tilt up state and then moves toward the rear of the vehicle, one of the engagement groove and the engagement projection presses the other one of the engagement groove and the engagement projection so that the rotation check member pivots to move to a second pivoting position at which the rotation check member unlocks movement of the movable panel.

BRIEF DESCRIPTION OF THE DRAWINGS

FIGS. 1A and 1B are a side view and a plan view schematically showing one embodiment, in which a rotation check member is immobile.

MODES FOR CARRYING OUT THE INVENTION

One embodiment according to the present invention will now be described. In the following description, the vehicle front-rear direction is referred to as "front-rear direction," vehicle frontward and rearward directions are referred to as "frontward" and "rearward" directions, respectively, and upward and downward directions in the vehicle height direction are referred to as "upward" and "downward" directions, respectively.

Figure 10:
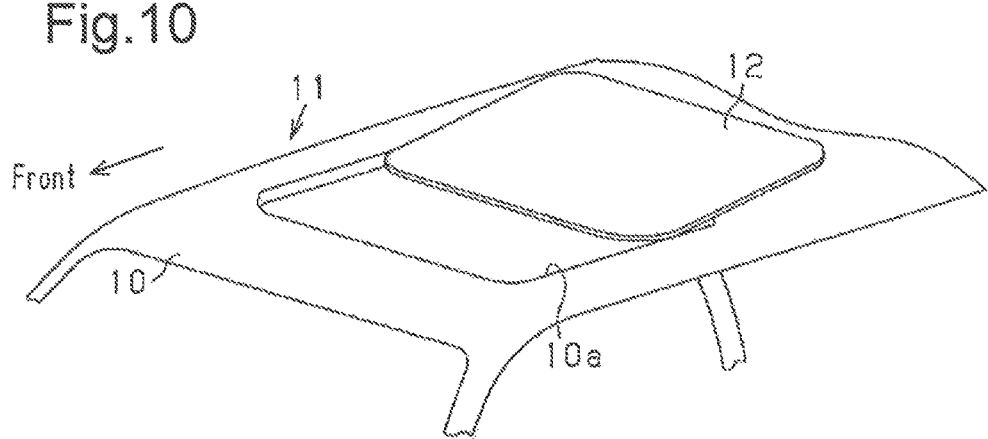
FIG. 10 is a perspective view of a roof viewed from obliquely above.

As shown in FIG. 10, a roof 10 of a vehicle, such as an automobile, includes a substantially rectangular opening 10a. A sunroof device 11, which supports a movable panel 12, is installed in the roof 10. The movable panel 12 is a substantially rectangular glass plate, for example.

The movable panel 12 is installed to be capable of a tilt, up operation and a slide operation in the front-rear direction. In the tilt up operation, the movable panel 12 pivots about, its front section, and the rear section of the movable panel 12 moves upward. The movable panel 12 is an outer sliding panel and slides in the tilt up state when opening and closing the opening 10a.

Structures of the sunroof device 11 related to functions such as opening and closing of the movable panel 12 will now be described. The sunroof device 11 includes a pair of structures that generally functions to open and close the movable panel 12 on the opposite sides in the vehicle width direction of the opening 10a. In the following descriptions, only one of the structures located on the opposite sides in the vehicle width direction will be described.

Referring to FIGS. 1A and 1B, a guide rail 14 is located at each edge in the vehicle width direction of the opening 10a. The guide rail 14 extends in the front-rear direction and substantially has a uniform cross-sectional shape. The guide rail 14 is an extrusion of an aluminum alloy, for example. The guide rail 14 includes an elongated bottom wall 14a, which extends in the front-rear direction, and a longitudinal wall 14b, which is substantially elongated and projects upward from the first edge in the vehicle width direction, of the bottom wall 14a. The guide rail 14 includes flange walls 14c and 14d, which project from the upper edge and the middle part in the vehicle height direction, respectively, of the side of the longitudinal wall 14b, which is connected to the bottom wall 14a (the front side as viewed in FIG. 1A). The flange walls 14c and 14d are substantially parallel to the bottom, wall 14a. The guide rail 14 forms a first rail section 14e and a second rail section 14f located on the lower side and the upper side of the flange wall 14d. The first and second rail, sections 14e and 14f open in the vehicle width direction and substantially have U-shaped cross-sections. As shown in FIG. 1B, the guide rail 14 includes a restraint wall 14g, which is a rib extending upward from the second edge in the vehicle width direction of the bottom wall 14a. The restraint wall 14g has a projecting dimension that is shorter than the distance between the bottom wall 14a and the flange wall 14a in the vehicle height direction.

The front end section of the bottom wall 14a has a substantially rectangular cutout section 14h on the side corresponding to the restraint wall 14g. A check block 15, which is made of plastic, for example, is fitted in the cutout section 14h. The check block 15 includes a bottom wall 16, which extends substantially flush with the bottom wall 14a, and a block restraint wall 17, which is a rib that continuously extends frontward from the restraint wall 14g and is flush with the upper edge of the restraint wall 14g.

The middle section in the front-rear direction of the bottom wall 16 includes an engagement recess 16a, which is recessed downward and has a substantially trapezoidal cross-section. The dimension of the bottom wall 16 in the vehicle width direction increases from the rear edge of the bottom wall 16 to the rear edge of the engagement recess 16a. The part of the bottom wall 16 located frontward of the rear edge of the engagement recess 16a has an increased and substantially uniform width. In conformance to the bottom wall 16, the block restraint wall 17 extends obliquely so that the distance to the longitudinal wall 14b in the vehicle width direction increases from the rear edge of the block restraint wall 17 to the rear edge of the engagement recess 16a. The part of the block restraint wall 17 located frontward of the rear edge of the engagement recess 16a is separated from the longitudinal wall 14b by an increased and substantially uniform distance.

The first rail section 14e of the guide rail 14 supports a front shoe 20 to be movable in the front-rear direction. More specifically, the front shoe 20 includes a substantially columnar shoe portion 21 extending in the vehicle width direction.

The shoe portion 21 is coupled to the first rail section 14e to be movable in the front-rear direction. The front shoe 20 also includes an arm 22 extending rearward from the shoe portion 21. A substantially tubular bearing portion 23 projects from the middle section in the front-rear direction of the arm 22 and opens in the vehicle width direction.

The edge in the vehicle width direction of the front section of the movable panel 12 is pivotally coupled to the front shoe 20 through a suitable bracket (not shown). The movable panel 12 performs the tilt up operation by pivoting about, an axis extending in the vehicle width direction with the part coupled to the front shoe 20 functioning as the pivot. Movement of the front shoe 20 in the front-rear direction causes the movable panel 12 to perform the slide operation.

A rotation check member 30 is coupled to the front shoe 20 to be pivotal about an axis extending in the vehicle width direction. A substantially columnar support pin 31 projects from the front end of the rotation check member 30. The support pin 31 faces the front shoe 20 and extends in the vehicle width direction. The support pin 31 is inserted into and supported by the bearing portion 23, pivotally coupling the rotation check member 30 to the shoe portion 21. In addition, the support pin 31 is inserted into the bearing portion 23 to be movable in the vehicle width direction, which allows the rotation check member 30 to move relative to the shoe portion 21 in the vehicle width direction.

As shown in FIG. 1A, the rotation check member 30 is engaged with one end of a coil spring 35, and the front shoe 20 is engaged with the other end of the coil spring 35. This urges the rotation check member 30 away from the front shoe 20 in the vehicle width direction. Thus, the rotation check member 30 moves in the vehicle width direction between the position in the vehicle width direction where the rotation check member 30 is in contact with the block restraint wall 17 of the check block 15 and the position in the vehicle width direction where the rotation check member 30 is in contact with the restraint wall 14g of the guide rail 14. Basically, when facing the block restraint wall 17 (the check block 15), the rotation check member 30 is located at a position in the vehicle width direction that is farther from the front shoe 20. When at a position facing the restraint wall 14g, the rotation check member 30 is located at a position in the vehicle width direction that is closer to the front shoe 20.

The rear end of the rotation check member 30 includes a head 32, which generally protrudes downward. The edge surface of the head 32 that faces the front shoe 20 includes an engagement groove 33, which extends in the vehicle wroth direction and substantially has the shape of a hook. The engagement groove 33 includes a first groove section 33a, which opens upward and extends frontward, a second groove section 33b, which is connected to the front end of the first groove section 33a and extends frontward and diagonally downward, and a third groove section 33c, which is connected to the lower end of the second groove section 33b and extends rearward. The rear end of the third groove section 33c is closed.

The coil spring 35 pivotally urges the rotation check member 30 in the clockwise direction as viewed in FIG. 1A, that is, in the direction that brings the head 32 into contact with the bottom wall 16 of the check block 15 or the bottom wall 14a of the guide rail 14. The rotation cheek member 30 is engaged with the engagement recess 16a when the head 32 is fitted into the engagement recess 16a. As a result, the front shoe 20, which is coupled to the rotation check member 30, and the movable panel 12 are restrained from moving relative to the guide rail 14 in the front-rear direction. The rotation check member 30 and the check block 15 form a check mechanism. When the head 32 is fitted into the engagement recess 16a, the rotation check member 30 is at a position where the rotation check member 30 is in contact, with the block restraint wall 17 of the check block 15, that is, at a position that is relatively far from the front, shoe 20 in the vehicle width direction. Hereinafter, the pivoting position of the rotation check member 30 that locks movement of the front shoe 20 is also referred to as the "lock position".

Figure 3A:
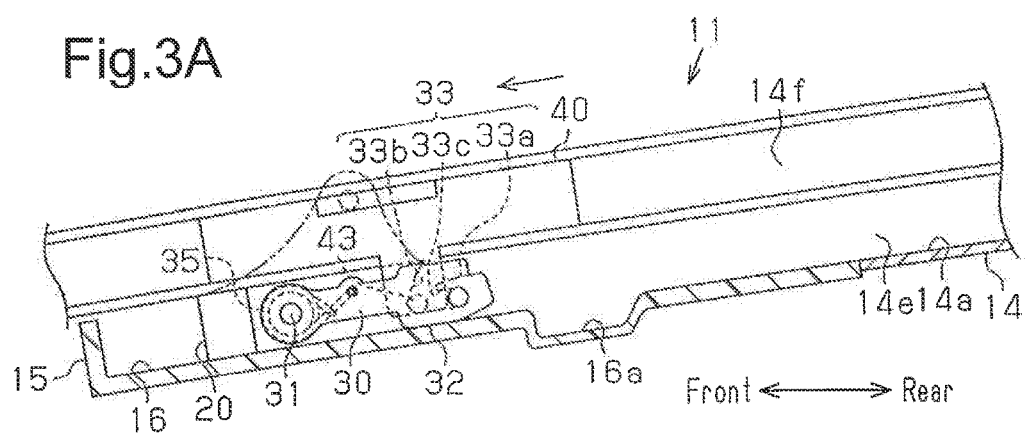
FIGS. 3A and 3B are a side view and a plan view of the embodiment of FIGS. 1A and 1B, showing how the engagement projection and the rotation check member are coupled when the engagement projection moves toward the front of the vehicle.
Figure 6A:
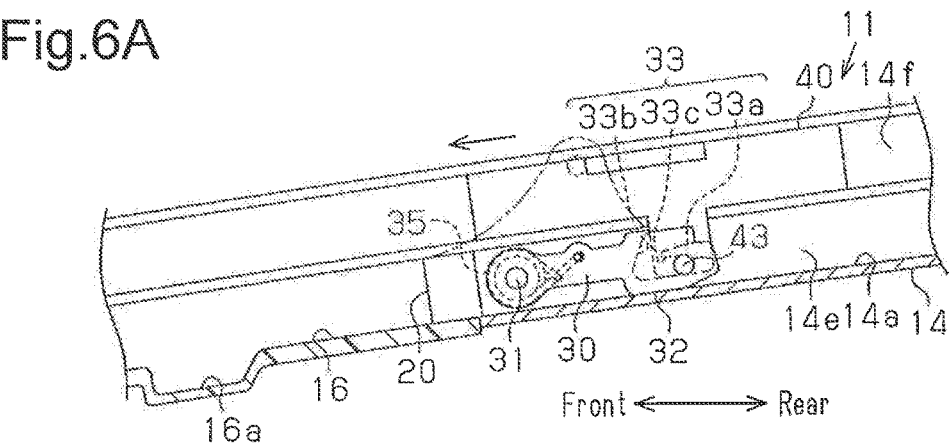
FIGS. 6A and 6B are a side view and a plan view of the embodiment of FIGS. 1A and 1B, showing how the engagement projection and the rotation check member are coupled when the engagement projection moves in the vehicle front-rear direction behind the check block.

As shown in FIGS. 3A and 6A, when the head 32 of the rotation check member 30, which is pivotally urged by the coil spring 35, is moved out of she engagement recess 16a of the check block 15 and contacts the bottom wall 16 or the bottom wall 14a of the guide rail 14, movements of the front shoe 20, which is coupled so the rotation check member 30, and the movable panel 12 relative to the guide rail 14 in the front-rear direction are unlocked. Hereinafter, the position of the rotation check member 30 at which movement of the front shoe 20 is unlocked is also referred to as the "unlock position".

Figure 9A:
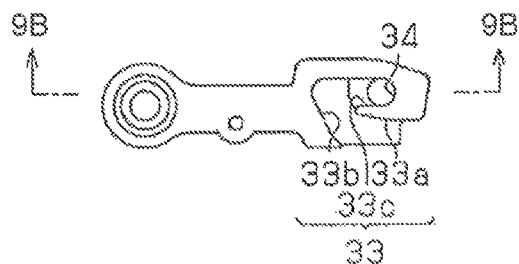
FIG. 9A is a side view showing the rotation check member.
Figure 9B:
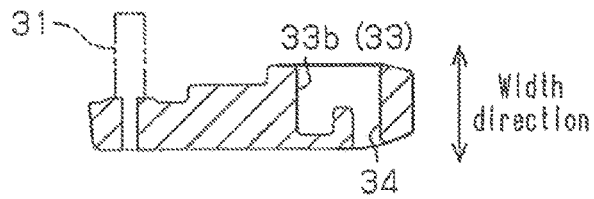
FIG. 9B is a cross-sectional view taken along line 9B-9B of FIG. 9A.

As shown in FIGS. 9A and 9B, the rotation check member 30 includes a substantially circular insertion recess 34, which is located at the rear end of the third groove section 33c and opens in the vehicle width direction.

As shown in FIG. 1A, the second rail, section 14f of the guide rail 14 supports a drive shoe 40 to be movable in the front-rear direction behind the front shoe 20. The drive shoe 40 functions as a sliding member. Specifically, the drive shoe 40 includes a shoe portion 41, which is extended in the front-rear direction and coupled to the second rail section 14f to be movable in the front-rear direction. The drive shoe 40 is connected to an electric driving source, such as an electric motor, (not shown) that moves the drive shoe 40 in the front-rear direction along the guide rail 14.

The drive shoe 40 also includes a coupling tab 42, which extends downward from the middle section in the front-rear direction of the shoe portion 41 beyond the distal end of the flange wall 14d. A substantially pin-shaped engagement projection 43 projects from the coupling tab 42 in the vehicle width direction. The coupling tab 42 is located between the front shoe 20 and the rotation check member 30 in the vehicle width direction. The engagement projection 43 is positioned such that the movement path of the engagement projection 43 in the front-rear direction along the guide rail 14 passes through the first groove section 31a of the rotation check member 30 at the lock position. Further, as shown FIGS. 3A and 6A, the engagement projection 43 is positioned such that its movement path in the front-rear direction along the guide rail 14 passes through the third groove section 33c of the rotation check member 30 at the unlock position.

The drive shoe 40 is linked to an edge in the vehicle width direction of the movable panel 12 through a suitable bracket (not shown). When the movable panel 12 is in the fully closed state, for example, frontward movement of the drive shoe 40 relative to the movable panel 12 lifts the linkage position to the movable panel 12. Such a linkage is achieved by a known structure including a combination of a cam recess that is formed in one of the movable panel 12 and the drive shoe 40 and has the shape of an elongated hole or a groove and a cam pin that projects from the other one of the movable panel 12 and the drive shoe 40 to be insertable info the cam recess, for example.

Operation of the present embodiment will now be described.

As shown in FIGS. 1A and 1B, when the movable panel 12 is in the fully closed state, the rotation check member 30, which is pivotally urged by the coil spring 35, is located at the lock position, where the head 32 of the rotation check member 30 is fitted into the engagement recess 16a of the check block 15. The front shoe 20, which is coupled to the rotation check member 30, and the movable panel 12 are restrained from moving relative to the guide rail 14 in the front-rear direction. The drove shoe 40 is located behind the front shoe 20 and is spaced apart from the front shoe 20. Thus, the linkage position between the drive shoe 40 and the movable panel 12 is located at a relatively low position. The first groove section 33a of the rotation check member 30 is located on the movement path of the engagement projection 43 in the front-rear direction along the guide rail 14 and opens rearward.

Figure 2:
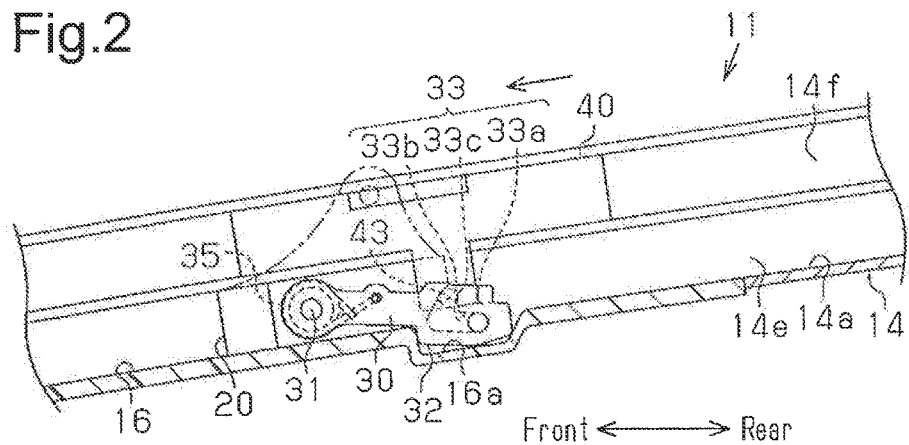
FIG. 2 is a side view of the embodiment of FIGS. 1A and 1B, showing how an engagement projection and the rotation check member contact when the engagement projection moves toward the front of the vehicle.

When the drive shoe 40 moves frontward along the guide rail 14 in the state described above, the drive shoe 40, while approaching the rotation check member 30, moves frontward relative to the movable panel 12, which is restrained by the rotation check member 30 from moving in the front-rear direction. This lifts the linkage position between the movable panel 12 and the drive shoe 40 so that the movable panel 12 pivots upward about the coupling position to the front shoe 20 and thus moves to the tilt up state. When the drive shoe 40 further moves frontward after the movable panel 12 has moved into the tilt up state, the engagement projection 43 enters the first groove section 33a of the engagement groove 33 and contacts the front end of the first groove section 33a (upper end of the second groove section 33b) as shown in FIG. 2.

Figure 3B:
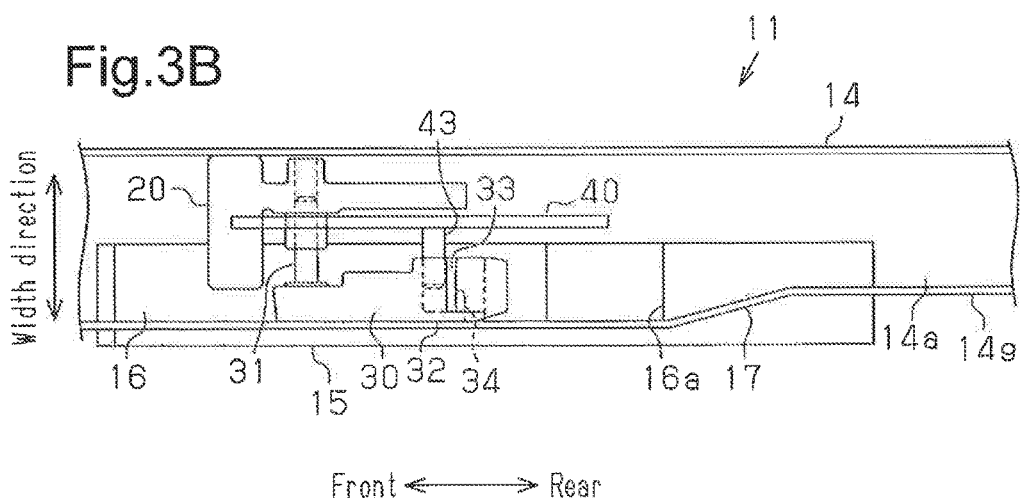

When the drive shoe 40 farther moves frontward along the guide rail 14 in the state described above, the engagement projection 43 presses the engagement groove 33 of the rotation check member 30. The pressing force of the engagement projection 43 received by the inclined surface of the second groove section 33b pivots the rotation check member 30 counterclockwise as viewed in FIG. 2 against the urging force of the coil spring 33. This moves the head 32 of the rotation check member 30 out of the engagement recess 16a of the check block 15, allowing the rotation check member 30 to move frontward together with the engagement projection 43 (the drive shoe 40). As shown in FIGS. 3A and 3B, when the drive shoe 10 further moves frontward, the engagement projection 43 presses the engagement groove 33 (the second groove section 33b) and moves the rotation check member 30 frontward together with the front shoe 20 and the movable panel 12. Here, the head 32 of the rotation check member 30 that has moved out of the engagement recess 16a is urged by the coil spring 35 and in contact with the bottom wall 16. The engagement projection 43 in the engagement groove 33 is in contact with the lower end of the second groove section 33b (the front end of the third groove section 33c).

Figure 4A:
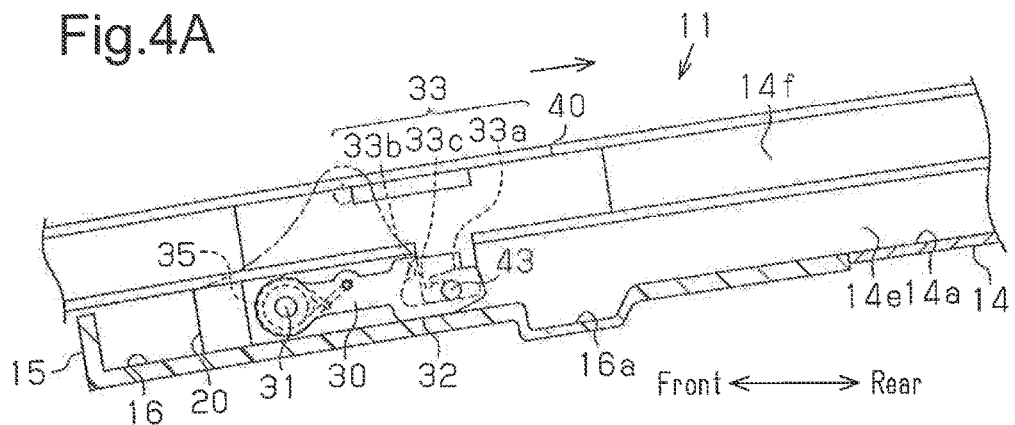
FIGS. 4A and 4B are a side view and a plan view of the embodiment of FIGS. 1A and 1B, showing how the engagement projection and the rotation check member are coupled when the engagement projection moves toward the rear of the vehicle.
Figure 4B:
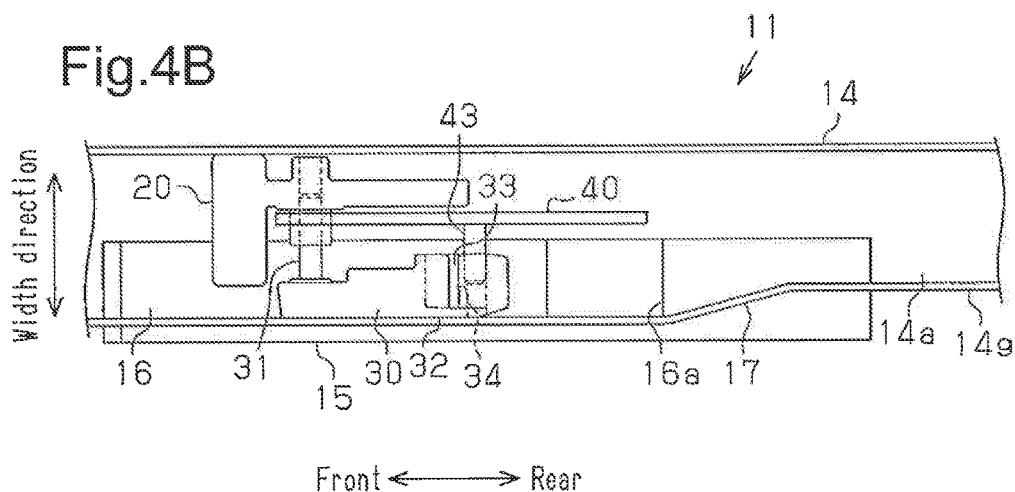

As shown in FIGS. 4A and 4B, when the drive shoe 40 stops and then reverses to move rearward, the engagement projection 43 moves within the third groove section 33c and contacts the rear end of the third groove section 33c. Here, the engagement projection 43 fitted in the third groove section 33c restrains movement of the rotation check member 30 in the vehicle height direction, that is, pivoting about the support pin 31. While the engagement projection 43 moves within the third groove section 33c, the drive shoe 40 moves rearward without moving the rotation check member 30. However, the drive shoe 40 moves only slightly during this movement so that the movable panel 12 remains in the tilt up state.

Figure 5:
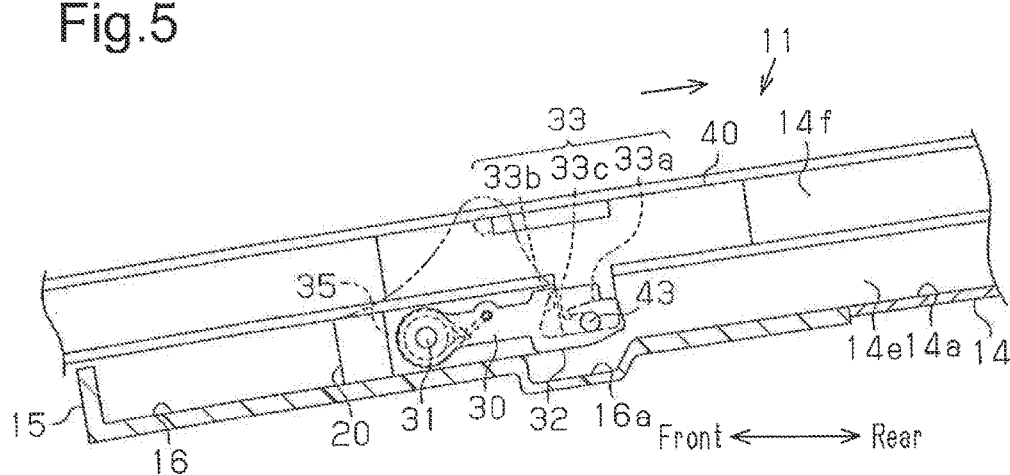
FIG. 5 is a side view of the embodiment of FIGS. 1A and 1B, showing how the engagement projection and the rotation check member are coupled when the engagement projection moves toward the rear of the vehicle.

As shown in FIG. 5, when the drive shoe 40 further moves rearward along the guide rail 14 in the state described above, the rotation check member 30, which is restrained from pivoting by the engagement projection 43 fitted in the third groove section 33c, is pressed by the engagement projection 43 to move rearward integrally with the front shoe 20 and passes beside the engagement recess 16a without inserting the head 32 into the engagement recess 16a. Here, the distance between the drive shoe 40 and the rotation check member 30 (the front shoe 20) in the front-rear direction remains constant, maintaining the tilt up state of the movable panel 12.

Figure 6B:
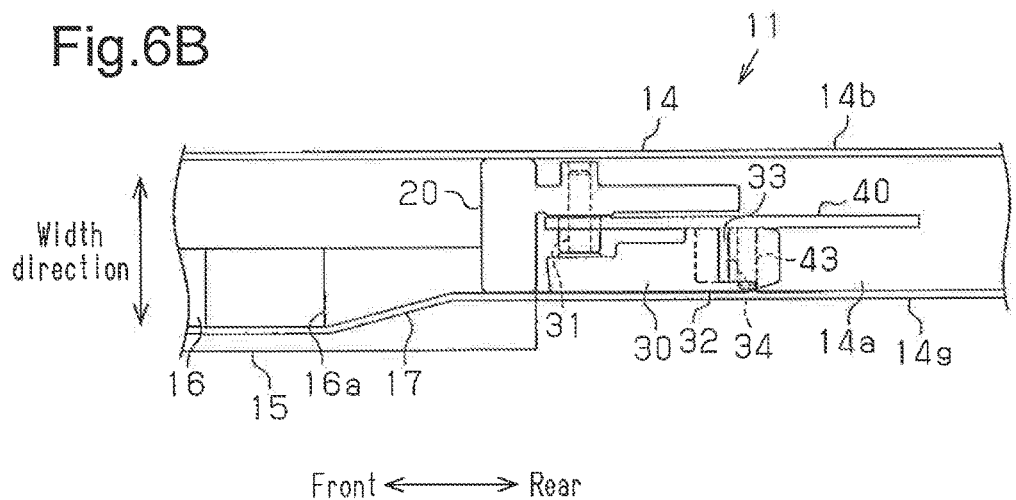

As shown in FIGS. 6A and 6B, when the drive shoe 40 further moves rearward along the guide rail 14 in the state described above, the rotation check member 30, which is pressed by the engagement projection 43, passes the check block 15 and reaches the guide raff 14 (the bottom wall 14a) behind the check block 15. Here, the distance between the drive shoe 40 and the rotation check member 30 (and other components including the front shoe 20) in the front-rear direction still remains constant. Accordingly, the movable panel 12 moves rearward, that is, starts an opening operation, while maintaining the tilt up state.

When, the rotation check member 30 passes the check block 15, the inclined rear end section of the block restraint wall 17, which functions as a guide member, guides the rotation check member 30 toward the front shoe 20 (and the drive shoe 40) in the vehicle width direction against the urging force of the coil spring 35. The rotation check member 30, which has passed the check block 15, is in contact with the restraint wall 14g of the guide rail 14 and thus remains at a position in the vehicle width direction that is closer to the front shoe 20 (and the drive shoe 40). Here, the movement of the rotation check member 30 in the vehicle width direction inserts the engagement projection 43, which is located at the rear end of the third groove section 33c (the insertion recess 34), into the insertion recess 34. This restrains movement of the rotation check member 30 relative to the drive shoe 40 in the front-rear direction. The rotation check member 30 and the engagement projection 43 form a lock-unlock switching mechanism.

When the rotation check number 30 moves in the front-rear direction behind the check block 15 together with the drive shoe 40, the distance between the drive shoe 40 and the rotation check member 30 (and other components including the front shoe 20) in the front-rear direction remains constant regardless of the moving direction of the drive shoe 40. Thus, when the drive shoe 40 moves rearward along the guide rail 14, for example, the movable panel 12 moves rearward, that is, performs the opening operation, while maintaining the tilt up state. The opening operation moves the movable panel 12 into the fully open state. In contrast, when the drive shoe 40 moves frontward along the guide rail 14, the movable panel 12 moves frontward, that is, performs the closing operation, while maintaining the tilt up state.

When the movable panel 12 is in the fully open state, for example, and the rotation check member 30 moves frontward along the guide rail 14 together with the drive shoe 40 and reaches the check block 15, the rotation cheek member 30, which is urged in the vehicle width direction by the coil spring 35, moves in the vehicle width direction away from the front shoe 20 (and the drive shoe 40) along the block restraint wall 17. The movement of the rotation check member 30 in the vehicle width direction brings the engagement projection 43, which is inserted in the insertion recess 34, out of the insertion recess 34. This allows the engagement projection 43 (the drive shoe 40) to move frontward relative to the rotation, check member 30. At the same time, the head 32 of the rotation check member 30 is placed over the engagement recess 16a of the check block 15. However, the engagement projection 43 is still located at the rear end of the third groove section 33c so that the rotation check member 30 remains in the state described above and is restrained from moving in the vehicle height direction, that is, restrained from pivoting about the support pin 31.

Figure 7:
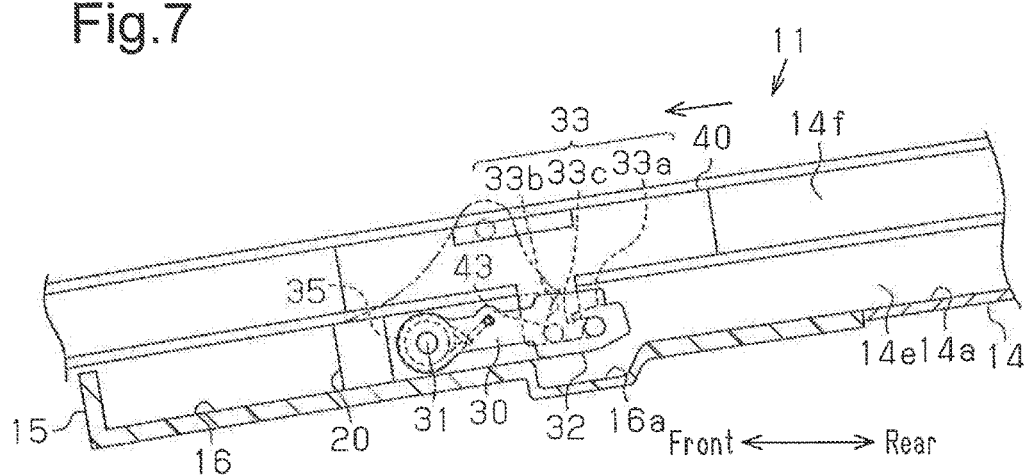
FIG. 7 is a side view of the embodiment of FIGS. 1A and 1B, showing the rotation check member immediately before becoming immobile.

As shown in FIG. 7, when the drive shoe 40 further moves frontward in the state described above, the engagement projection 43 moves within the third groove section 33c and contacts the front end or the third groove section 33c (the lower end of the second groove section 33b). Here, since the engagement projection 43 is located at the lower end of the inclined second groove section 33b, the rotation check member 30 is still restrained from pivoting about the support pin 31.

Figure 8:
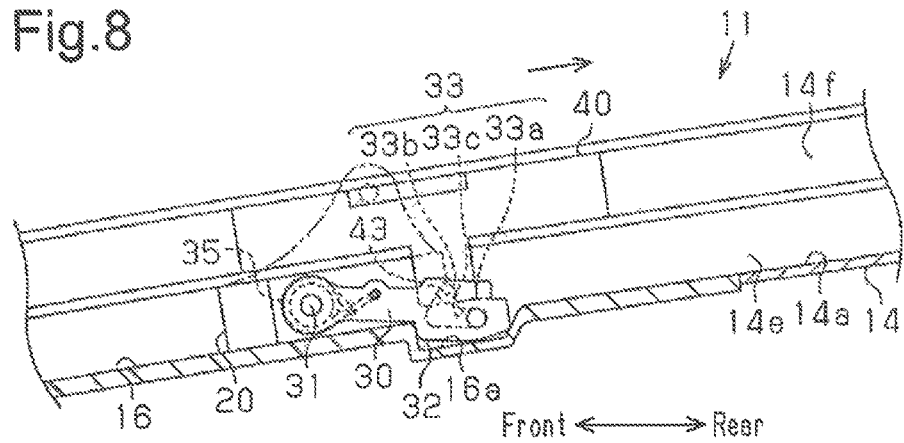
FIG. 8 is a side view of the embodiment of FIGS. 1A and 1B, showing the rotation check member immediately after becoming immobile.

As shown in FIG. 8, when the drive shoe 40 stops and then reverses to move rearward, the rotation check member 30, which is pivotally urged by the coil spring 33, pivots clockwise as viewed in FIG. 8 about the support pin 31 while being disengaged from, the engagement projection 43 along the second groove section 33b. Accordingly, the head 32 of the rotation check member 30 is fitted into the engagement recess 16a of the check block 15. This restrains the rotation check member 30 (and the movable panel 12) from moving relative to the guide rail 14 in the front-rear direction. At the same time, the first groove section 33a of the rotation check member 30 opens the rear side of the engagement projection 43.

When the drive shoe 40 further moves rearward along the guide rail 14 in the state described above, the drive shoe 40 moves rearward away from the rotation check member 30 and the movable panel 12, which is restrained by the rotation check member 30 from moving in the front-rear direction. This lowers the linkage position between the movable panel 12 and the drive shoe 40, causing the movable panel 12 to perform the tilt down operation and pivot downward about the coupling position to the front shoe 20. Then, the drive shoe 40 stops when the movable panel 12 moves (returns) to the fully closed state.

The above described embodiment achieves the following advantages.

(1) In the present embodiment, when the drive shoe 40 farther moves frontward while the movable panel 12 is in the tilt up state and then moves rearward, the rotation cheek member 30 and other components maintain the tilt up state and unlock movement, of the movable panel 12. That is, in the tilt up state, when the drive shoe 40 further moves frontward and then moves rearward, the engagement projection 43 presses the engagement groove 33 of the rotation check member 30 so that the rotation check member 30 pivots from the lock position to the unlock position. The pressing of the rotation check member 30 (the engagement groove 33) by the engagement projection 43 engages the engagement projection 43 and the rotation check member 30 such that the movable panel 12 moves integrally with the drive shoe 40 when the drive shoe 40 later moves rearward. Since the movable panel 12 moves rearward integrally with the drive shoe 40, the movable panel 12 opens while maintaining the tilt up state. The maximum movement amount, of the drive shoe 40 that brings the movable panel 12 into the fully open state is not limited by the movement amount of the drive shoe 40 in the opposite direction, (frontward) that, is required to bring the movable panel 12 into the tilt up state. This increases the maximum movement amount of the drive shoe 40 that determines the fully open state of the movable panel 12, that is, increases the opening amount of the movable panel 12.

(2) In the present embodiment, when the drive shoe 40 further moves frontward in the tilt up state and then moves rearward, the rotation check member 30 is guided toward the engagement projection 43 in the vehicle width direction by the block restraint wall 17 while being pressed by the engagement projection 43. This inserts the engagement projection 43 into the insertion recess 34, restraining the rotation check member 30 and the engagement, projection 43 from moving relative to each other in the front-rear direction. Further, the rotation check member 30 is engaged with the engagement projection 43 such that, the movable panel 12 moves integrally with the drive shoe 40 when the drive shoe 40 later moves rearward. A component of the check mechanism (the rotation check member 30) is used to form the lock-unlock switching mechanism, reducing the number of components.

When the engagement projection 43 is inserted in the insertion recess 34, the block restraint wall 17 and the restraint wall 14g guide and hold the drive shoe 40 and the rotation check member 30 closer to each other in the vehicle width direction. Thus, when the movable panel 12 is in the fully open state, for example, displacement of the drive shoe 40 and the rotation, check member 30 in the vehicle width direction and the vehicle front-rear direction is restrained. This limits rattling of the movable panel 12, which is supported by the rotation check member 30, in the vehicle width direction and the vehicle front-rear direction.

(3) In the present embodiment, the rotation check member 30, which has a simple lever-shaped structure, functions both as the check mechanism and the look-unlock switching mechanism simply by setting the rotation check member 30, which controls movements of the movable panel 12, to move in two directions, the pivoting direction about the support pin 31 and the axis direction of the support pin 31 (the vehicle width direction).

(4) In the present embodiment, the simple structure including the reduced number of components saves space of various mechanisms and improves the operation reliability. Moreover, the reduced number of components reduces the costs.

The above described embodiment may be modified as follows.

In the above embodiment, the coil spring 35 pivotally urges the rotation check member 30 about the support pin 31 and also urges the rotation check member 30 in the vehicle width direction. However, an urging member that pivotally urges the rotation, check member 30 about the support pin 31 and an urging member that urges the rotation check member 30 in the vehicle width direction may be separately provided.

The check block 15 may be separate from the guide rail 14 or formed integrally with the guide rail 14 by outsert molding.

In the above embodiment, the engagement between the rotation check member 30 and the check block 15 (the engagement recess 16a) restrains the movable panel 12 from moving in the front-rear direction. However, movement, of the movable panel 12 in the front-rear direction may be restrained by the shape of the guide rail 14 (e.g., cutout section), for example.

As long as the rotation check member 30 can pivot about an axis that is perpendicular to the open and close directions of the movable panel 12, the rotation check member 30 may pivot in any direction.

In the above embodiment, the rotation check member 30, which functions as the cheek mechanism, also functions as the lock-unlock switching mechanism. However, a lock-unlock switching mechanism that is separate from the rotation check member 30 may be provided. In this case, the lock-unlock switching mechanism may be positioned sot any location and have any structure.

In the above embodiment, the rotation check member 30 includes the engagement groove 33, and the drive shoe 40 includes the engagement projection 43. However, the present invention is not limited to such a structure. The rotation check member 30 may include an engagement projection, and the drive shoe 40 may include an engagement groove.

The invention claimed is:

1. A vehicle sunroof device comprising:
a movable panel configured to open and close an opening formed in a roof of a vehicle;
a guide rail configured to be located at an edge in a vehicle width direction of the opening and extend in a vehicle front-rear direction;
a sliding member, which is coupled to an edge in the vehicle width direction of the movable panel and moved in the vehicle front-rear direction along the guide rail;
a check mechanism configured such that, when the sliding member moves toward the front of the vehicle while the movable panel is in a fully closed state, the check mechanism locks movement of the movable panel in the vehicle front-rear direction and frontward movement of the sliding member lifts a linkage between the movable panel and the sliding member so that a rear section of the movable panel with a front section of the movable panel functioning as a pivot so as to bring the movable panel into a tilt up state, and that, when the sliding member moves toward the rear of the vehicle after further moving toward the front of the vehicle while the movable panel is in the tilt up state, the check mechanism maintains the tilt up state and unlocks movement of the movable panel, wherein
the sliding member includes an engagement projection extending in the vehicle width direction,
the check mechanism includes a rotation check member, which includes an engagement groove and is pivotally coupled to the sliding member and pivotal about an axis extending in the vehicle width direction, the engagement groove having an opening that allows the engagement projection to enter the engagement groove and to disengage from the engagement groove,
the rotation check member is configured to move between a first pivoting position at which the rotation check member locks movement of the movable panel and a second pivoting position at which the rotation check member unlocks movement of the movable panel,
when the sliding member moves toward the front of the vehicle to approach the rotation check member while the rotation check member is held at the first pivoting position, the movable panel moves from the fully closed state to the tilt up state,
when the sliding member further moves toward the front of the vehicle in the tilt up state of the movable panel, the engagement projection enters the engagement groove and presses the rotation check member to move the rotation check member to the second pivoting position from the first pivoting position,
when the sliding member moves toward the rear of the vehicle after the further movement of the sliding member toward the front of the vehicle, the engagement projection is engaged with the rotation check member in the engagement groove such that the engagement projection holds the rotation check member at the second pivoting position and the sliding member and the movable panel move integrally.

2. The vehicle sunroof device according to claim 1, wherein:
the check mechanism includes a check block, which includes an engagement recess and is located in the guide rail,
the rotation check member is pivotal about an axis perpendicular to the vehicle front-rear direction, and is pivotally urged in a direction that, brings the rotation check member into engagement with the engagement recess,
when the movable panel is in the fully closed state, the rotation check member is engaged with the engagement recess and locks movement of the movable panel in the vehicle front-rear direction, and
when the sliding member further moves toward the front of the vehicle while the movable panel is in the tilt up state, the engagement projection presses the engagement groove so that the rotation check member pivots to be disengaged from the engagement recess and unlock movement of the movable panel in the vehicle front-rear direction.

3. The vehicle sunroof device according to claim 2, wherein
the check block includes a guide member,
the rotation check member is urged away from the engagement projection in the vehicle width direction and includes an insertion recess, and
when the sliding member moves toward the rear of the vehicle after further moving toward the front of the vehicle while the movable panel is in the tilt up state, the rotation check member is guided by the guide member toward the engagement projection in the vehicle width direction while being pressed by the engagement projection so that the engagement projection is inserted into the insertion recess.

* * * * *